(12) United States Patent
Iwasaki et al.

(10) Patent No.: US 10,953,637 B2
(45) Date of Patent: Mar. 23, 2021

(54) THERMAL TRANSFER SHEET AND COMBINATION OF TRANSFER FOIL AND THERMAL TRANSFER SHEET

(71) Applicant: Dai Nippon Printing Co., Ltd., Tokyo (JP)

(72) Inventors: Yuki Iwasaki, Tokyo (JP); Shinya Yoda, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 143 days.

(21) Appl. No.: 16/082,366

(22) PCT Filed: Mar. 7, 2017

(86) PCT No.: PCT/JP2017/009043
§ 371 (c)(1),
(2) Date: Sep. 5, 2018

(87) PCT Pub. No.: WO2017/154920
PCT Pub. Date: Sep. 14, 2017

(65) Prior Publication Data
US 2019/0061399 A1 Feb. 28, 2019

(30) Foreign Application Priority Data

Mar. 8, 2016 (JP) .............. JP2016-044620
Mar. 9, 2016 (JP) .............. JP2016-046075

(51) Int. Cl.
*B32B 27/00* (2006.01)
*B32B 27/30* (2006.01)
(Continued)

(52) U.S. Cl.
CPC ............ *B32B 27/00* (2013.01); *B32B 27/304* (2013.01); *B32B 27/36* (2013.01); *B41M 5/5272* (2013.01); *Y10T 428/24802* (2015.01)

(58) Field of Classification Search
CPC .................. B41M 5/38207; B41M 5/382
(Continued)

(56) References Cited

U.S. PATENT DOCUMENTS

| 2003/0035935 | A1 | 2/2003 | Wachi et al. |
| 2003/0137579 | A1* | 7/2003 | Tamura .............. B41M 5/38207 347/217 |

(Continued)

FOREIGN PATENT DOCUMENTS

| EP | 1 342 584 A1 | 9/2003 |
| EP | 2 902 213 A1 | 8/2015 |

(Continued)

OTHER PUBLICATIONS

International Search Report and Written Opinion (Application No. PCT/JP2017/009043) dated May 9, 2017.

(Continued)

*Primary Examiner* — Betelhem Shewareged
(74) *Attorney, Agent, or Firm* — Burr & Brown, PLLC

(57) ABSTRACT

A thermal transfer sheet is provided that accurately removes a transfer layer. The thermal transfer sheet includes a peel-off layer affixed to a substrate. The peel-off layer (i) contains at least a vinyl chloride-type resin and an acrylic-type resin, and a mass of the vinyl chloride-type resin based on a total mass of the peel-off layer is more than 50% by mass and not more than 95% by mass, or the peel-off layer (ii) contains a polyester-type resin having a number average molecular weight (Mn) of not more than 17000 and a glass transition temperature (Tg) of not less than 50° C. and not more than 120° C.

1 Claim, 3 Drawing Sheets

(51) Int. Cl.
*B32B 27/36* (2006.01)
*B41M 5/52* (2006.01)

(58) Field of Classification Search
USPC ....................................................... 428/195.1
See application file for complete search history.

(56) References Cited

U.S. PATENT DOCUMENTS

| | | | |
|---|---|---|---|
| 2003/0174197 A1* | 9/2003 | Odaka ................ | B41M 5/38257 347/175 |
| 2015/0239273 A1* | 8/2015 | Sakamoto .......... | B41M 5/38257 428/32.77 |
| 2019/0061399 A1* | 2/2019 | Iwasaki ................ | B41M 5/0256 |

FOREIGN PATENT DOCUMENTS

| | | |
|---|---|---|
| JP | H07-266589 A1 | 10/1995 |
| JP | 2002-337469 A1 | 11/2002 |
| JP | 2003-260878 A1 | 9/2003 |
| JP | 2003-326865 A1 | 11/2003 |
| JP | 2011-016332 A1 | 1/2011 |
| JP | 2014-080016 A1 | 5/2014 |
| JP | 2015-047697 A1 | 3/2015 |
| JP | 2015-196741 A1 | 11/2015 |

OTHER PUBLICATIONS

Korean Office Action (Application No. 10-2018-7025441) dated Jul. 29, 2020.

* cited by examiner

THERMAL TRANSFER SHEET AND COMBINATION OF TRANSFER FOIL AND THERMAL TRANSFER SHEET

BACKGROUND OF THE INVENTION

1. Field of the Invention

The present invention relates to a thermal transfer sheet, and a combination of a transfer foil and a thermal transfer sheet.

2. Description of Related Art

As proposed in Patent Literature 1, an intermediate transfer medium in which a transfer layer including a receiving layer (which may be referred to as a transfer layer, hereinafter) is peelably provided on a substrate is used as a device for forming a print without having constraints on the types of transfer receiving articles. With this intermediate transfer medium, a print in which a thermal transfer image is formed on any transfer receiving article can be obtained by using a thermal transfer sheet having a colorant layer to form a thermal transfer image on the receiving layer of the intermediate transfer medium, and then transferring the transfer layer including the receiving layer onto any transfer receiving article. In particular, the intermediate transfer medium is particularly preferably used for, for example, a transfer receiving article on which a colorant is less likely to be transferred, and a high-quality image cannot be directly formed, or a transfer receiving article that is likely to fuse with the colorant layer during thermal transfer.

Depending on the types of prints obtained by transferring the transfer layer of the intermediate transfer medium onto a transfer receiving article, it may be necessary to leave a certain region, for example, a region allocated for an IC chip, a magnetic stripe, a transmitting and receiving antenna unit, a signature portion, or the like. Thus, on the surface of the transfer receiving article, there may be regions that cause inconvenience if they are covered with the transfer layer. In other words, there are some cases where the surface of the transfer receiving article needs to be exposed.

Under these circumstances, an attempt has been made to use a thermal transfer sheet in which a peel-off layer is provided on one surface of a substrate, to remove (which may also be referred to as peel off), in advance of transferring a transfer layer of an intermediate transfer medium onto a transfer receiving article, a predetermined region of the transfer layer, such as a region of the transfer layer where transfer onto the transfer receiving article is not intended, by means of the peel-off layer. For example, Patent Literature 2 proposes a method and the like in which a peel-off layer of a thermal transfer sheet and a transfer layer of an intermediate transfer medium are superposed on each other to contact each other, and then energy is applied to the other surface of the substrate of the thermal transfer sheet to remove a predetermined region of the transfer layer corresponding to the region to which energy has been applied, by means of the peel-off layer.

The above-described thermal transfer sheet having the peel-off layer is required to have the function of accurately removing a predetermined region of the transfer layer, in other words, is required to have the function of removing a predetermined region of the transfer layer, as intended. In fact, however, a portion of the transfer layer that should be removed with the peel-off layer often remains on the intermediate transfer medium, and there is room left for improvement in this respect.

CITATION LIST

Patent Literature

Patent Literature 1: Japanese Patent Laid-Open No. 2014-80016
Patent Literature 2: Japanese Patent Laid-Open No. 2003-326865

SUMMARY OF THE INVENTION

Technical Problem

The present invention has been made in view of the above-mentioned circumstances, and principally aims to provide a thermal transfer sheet that can accurately remove a predetermined region of a transfer layer, and a combination of a transfer foil and the thermal transfer sheet.

Solution to Problem

A thermal transfer sheet according to an embodiment of the present disclosure for solving the above-mentioned problem is a thermal transfer sheet comprising a peel-off layer on a substrate, wherein the peel-off layer contains at least a vinyl chloride-type resin and an acrylic-type resin, and a mass of the vinyl chloride-type resin based on a total mass of the peel-off layer is more than 50% by mass and not more than 95% by mass.

Furthermore, a thermal transfer sheet according to an embodiment of the present disclosure for solving the above-mentioned problem is a thermal transfer sheet comprising a peel-off layer on a substrate, wherein the peel-off layer contains a polyester-type resin having a number average molecular weight (Mn) of not more than 17000, and having a glass transition temperature (Tg) of not less than 50° C. and not more than 120° C.

The polyester-type resin may be a polyester-type resin having a number average molecular weight (Mn) of not less than 3500 and less than 9000. The polyester-type resin may also be a polyester-type resin having a glass transition temperature (Tg) of not less than 50° C. and not more than 100° C.

Furthermore, a combination according to an embodiment of the present disclosure for solving the above-mentioned problem is a combination of a transfer foil and a thermal transfer sheet, wherein the transfer foil has a structure in which a transfer layer is provided on a support such that the transfer layer can be peeled off from the support, the thermal transfer sheet has a structure in which a peel-off layer is provided on a substrate, and under conditions in which the transfer foil and the thermal transfer sheet are superposed on each other such that the transfer layer and the peel-off layer are opposed to each other, and a transport speed for the thermal transfer sheet is set to 42.3 mm/sec, and energy applied to the thermal transfer sheet is set to 0.143 mJ/dot, adhesion between the transfer layer and the peel-off layer as measured when a predetermined region of the transfer layer is removed by means of the peel-off layer is not less than 0.03 N/cm.

The adhesion as measured when the energy applied to the thermal transfer sheet is changed in the range of not less than 0.1 mJ/dot and not more than 0.2 mJ/dot may be not less than 0.03 N/cm.

Advantageous Effects of Invention

With the thermal transfer sheet of the present invention or the combination of a transfer foil and a thermal transfer sheet of the present invention, a predetermined region of the transfer layer can be accurately removed by means of the peel-off layer.

DETAILED DESCRIPTION OF THE INVENTION

<<Thermal Transfer Sheet>>

Figure 1:
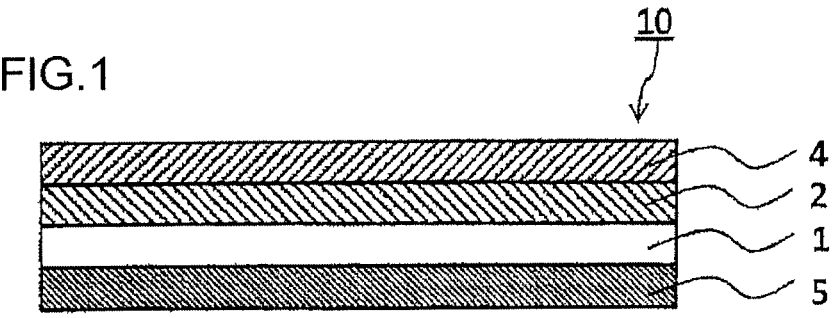
FIG. 1 is a schematic cross-sectional view of a thermal transfer sheet according to an embodiment.

A thermal transfer sheet 10 according to an embodiment of the present disclosure (hereinafter referred to as the thermal transfer sheet according to an embodiment) has a structure in which a peel-off layer 4 is provided on one surface of a substrate 1, as shown in FIG. 1. In the embodiment shown in FIG. 1, a back face layer 5 is provided on the other surface of the substrate 1, and a primer layer 2 is provided between the substrate 1 and the peel-off layer 4. The primer layer 2 and the back face layer 5 are optional constituents in the thermal transfer sheet according to an embodiment.

Figure 2:
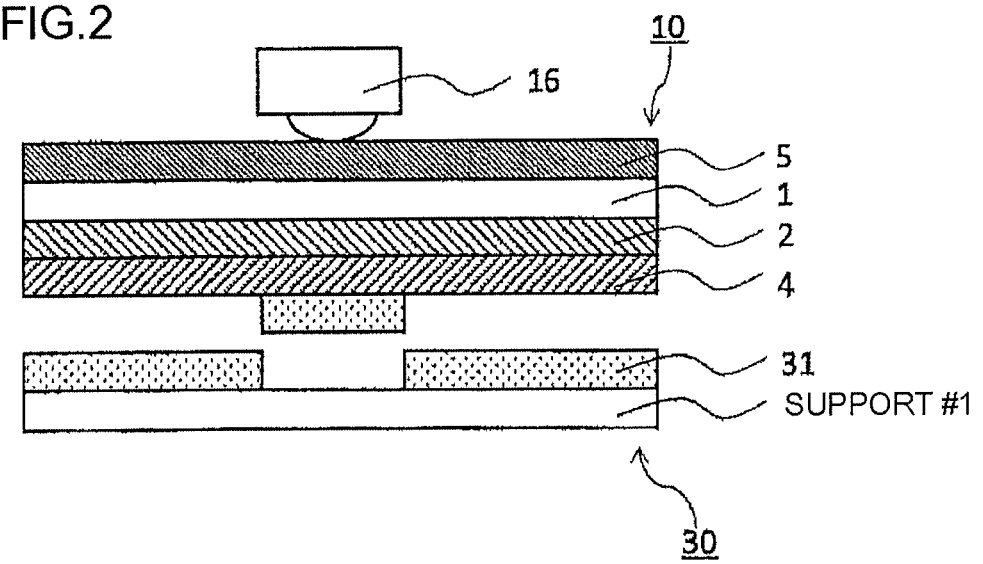
FIG. 2 is a schematic cross-sectional view showing a state in which energy is applied to a combination of the thermal transfer sheet according to an embodiment and an intermediate transfer medium.

The thermal transfer sheet 10 according to an embodiment is a thermal transfer sheet used for removing a predetermined region of a transfer layer of an intermediate transfer medium. Specifically, as shown in FIG. 2, the thermal transfer sheet 10 is used for the following purpose: the peel-off layer 4 of the thermal transfer sheet 10 and a transfer layer 31 of an intermediate transfer medium 30 are superposed on each other, energy is applied to the back surface side of the thermal transfer sheet 10 by means of a heating device 16 such as a thermal head, and a predetermined region of the transfer layer 31 of the intermediate transfer medium 30 corresponding to the region to which energy has been applied is removed. Hereinafter, the present invention will be described referring to a case where the transfer layer to be removed by the peel-off layer 4 of the thermal transfer sheet 10 according to an embodiment is the transfer layer of the intermediate transfer medium. However, the transfer layer to be removed by the peel-off layer 4 of the thermal transfer sheet 10 according to an embodiment may also be a transfer layer of a protective layer transfer sheet. The transfer layer of the intermediate transfer medium has a single-layer structure composed of a receiving layer only, or a layered structure in which a receiving layer and other layers are layered. The transfer layer of the intermediate transfer medium is provided on a support such that it can be peeled off from the support. When the transfer layer of the intermediate transfer medium has a layered structure composed of not less than two layers, the receiving layer is positioned farthest from the support. The transfer layer of the protective layer transfer sheet has a single-layer structure composed of a protective layer only, or a layered structure in which a protective layer and other layers are layered. The transfer layer of the protective layer transfer sheet is provided on a support such that it can be peeled off from the support. Examples of other layers include a release layer. The transfer layer of the intermediate transfer medium or the transfer layer of the protective layer transfer sheet after being peeled off from the support is transferable onto a transfer receiving article. An object having a transfer layer other than the above may also be used. The removal performance for removing a predetermined region of the transfer layer 31 of the intermediate transfer medium 30 by using the thermal transfer sheet 10 having the peel-off layer 4 will be hereinafter called the "peel-off property". Herein, "good peel-off property" means that a predetermined region of the transfer layer can be accurately removed by the peel-off layer 4, in other words, the transfer layer 31 can be removed as intended. As used herein, "thermal transfer sheet" is a collective term for media to which a heating device such as a thermal head is applied. "Thermal transfer sheet" also includes a thermal transfer sheet that is used for removing a portion of the transfer layer 31 of the intermediate transfer medium 30 by applying a heating device, and has a structure in which the peel-off layer 4 is provided on one surface of the substrate, as in the present invention.

(Substrate)

There is no limitation on the substrate 1 forming the thermal transfer sheet 10 according to an embodiment, and a substrate selected as appropriate from those known in the field of thermal transfer sheets can be used. Examples of the substrate include thin paper such as glassine paper, condenser paper, and paraffin paper; and stretched or unstretched plastic films, for example, polyesters having high heat resistance such as polyethylene terephthalate, polyethylene naphthalate, polybutylene terephthalate, polyphenylene sulfide, polyether ketone, and polyether sulfone, polypropylene, polycarbonate, cellulose acetate, polyethylene derivatives, polyvinyl chloride, polyvinylidene chloride, polystyrene, polyamide, polyimide, polymethylpentene, and ionomers. Composite films obtained by layering two or more of these materials can be also used.

While there is no particular limitation on the thickness of the substrate 1, the thickness is preferably not less than 2 μm and not more than 10 μm. Furthermore, the surfaces of the substrate 1 may be subjected to an adhesive treatment to improve the adhesion between the substrate 1 and the below-described peel-off layer 4. That is, the adhesive-treated substrate 1 may be used. Examples of the adhesive treatment include known resin surface-modifying techniques, such as a corona discharge treatment, a flame treatment, an ozonization treatment, an ultraviolet treatment, a radiation treatment, a surface roughening treatment, a chemical treatment, a plasma treatment, a low-temperature plasma treatment, and a grafting treatment. These treatments may be used in a combination of two or more. Instead of using the adhesive-treated substrate 1, or together with the adhesive-treated substrate 1, the below-described primer layer 2 may be provided between the substrate 1 and the peel-off layer 4.

(Peel-Off Layer According to a First Embodiment)

As shown in FIG. 2, the peel-off layer 4 forming the thermal transfer sheet 10 according to an embodiment is a layer that serves to remove a predetermined region (region where removal is intended) of the transfer layer 31 of the intermediate transfer medium 30. Specifically, the peel-off layer 4 is a layer used for the following purpose: the transfer layer 31 of the intermediate transfer medium 30 and the peel-off layer 4 of the thermal transfer sheet 10 are superposed on each other, energy is applied to the back surface side of the thermal transfer sheet 10 by means of the heating device 16 such as a thermal head, and the transfer layer 31 positioned in a region corresponding to the region to which energy has been applied is removed. The intermediate transfer medium 30 according to the embodiments shown in FIGS. 2 and 3 has a structure in which the transfer layer 31 is provided on the support.

Herein, in the thermal transfer sheet 10 according to an embodiment, the peel-off layer 4 contains a vinyl chloride-type resin and an acrylic-type resin, and a mass of the vinyl chloride-type resin based on a total mass of the peel-off layer 4 is more than 50% by mass and not more than 95% by mass. The peel-off layer having these features may be hereinafter referred to as the peel-off layer according to the first embodiment.

With the thermal transfer sheet 10 according to an embodiment having the peel-off layer according to the first embodiment, a predetermined region of the transfer layer 31 where removal is intended can be accurately removed by the peel-off layer 4 according to the first embodiment.

Even if the peel-off layer 4 contains a vinyl chloride-type resin and an acrylic-type resin, a sufficiently satisfactory peel-off property cannot be obtained if the mass of the vinyl chloride-type resin based on the total mass of the peel-off layer 4 is not more than 50% by mass. Specifically, the transfer layer positioned near the boundary between a non-removal region and a removal region of the transfer layer where removal by the peel-off layer is intended cannot be accurately removed, and a portion of the removal region of the transfer layer that should be originally removed is likely to remain on the intermediate transfer medium. As a result, a predetermined region of the transfer layer 31 where removal is intended cannot be accurately removed. Alternatively, with the boundary between a removal region and a non-removal region as a start point, a portion of the transfer layer in the non-removal region is removed in such a manner as to trail the transfer layer in the non-removal region, and the transfer layer that should originally remain on the intermediate transfer medium, that is, the transfer layer in the non-removal region, is removed along with the transfer layer corresponding to the removal region. As a result, a predetermined region of the transfer layer 31 where removal is intended cannot be accurately removed.

Figure 3:
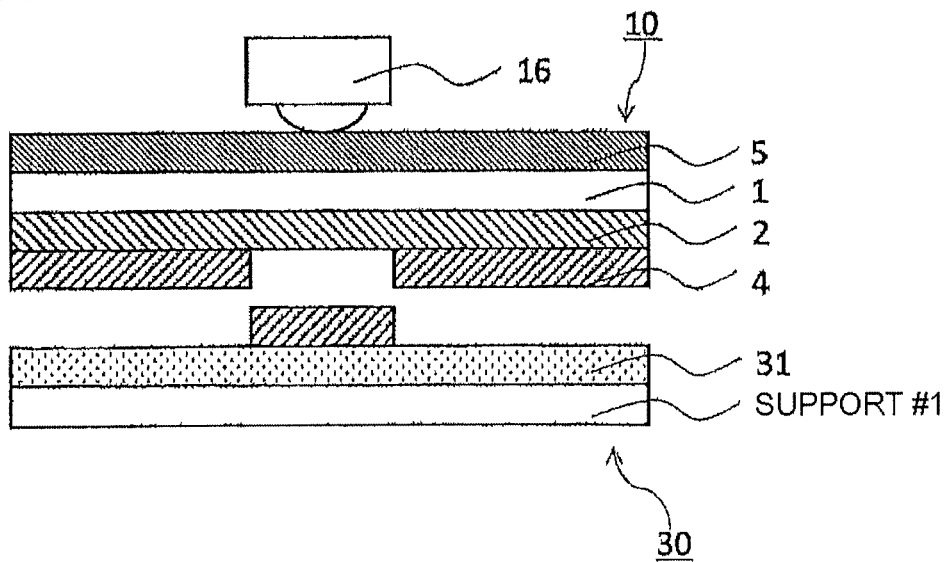
FIG. 3 is a schematic cross-sectional view showing a state in which energy is applied to a combination of a comparative thermal transfer sheet and an intermediate transfer medium.

Furthermore, even if the peel-off layer 4 contains a vinyl chloride-type resin and an acrylic-type resin, if the mass of the vinyl chloride-type resin based on the total mass of the peel-off layer 4 is more than 95% by mass, the adhesion between the transfer layer 31 of the intermediate transfer medium 30 and the peel-off layer 4 will be excessively strong. As a result, as shown in FIG. 3, it is likely that the peel-off layer 4 that should originally remain on the thermal transfer sheet 10 will be taken by the intermediate transfer medium 30.

Furthermore, even if the peel-off layer 4 contains more than 50% by mass and not more than 95% by mass of the vinyl chloride-type resin based on the total mass of the peel-off layer 4, if it does not contain an acrylic-type resin, the adhesion between the substrate 1 and the peel-off layer 4 will decrease. As a result, as shown in FIG. 3, it is likely that the peel-off layer 4 that should originally remain on the thermal transfer sheet 10 will be taken by the intermediate transfer medium 30.

The mechanism by which the peel-off property is improved by including a vinyl chloride-type resin and an acrylic-type resin, and setting the content of the vinyl chloride-type resin to be more than 50% by mass and not more than 95% by mass based on the total mass of the peel-off layer, has not been revealed yet. However, at least the fact that the content of the vinyl chloride-type resin, and the acrylic-type resin used in combination with the vinyl chloride-type resin affect the peel-off property, has been revealed from the results of the examples and comparative examples described below.

The peel-off layer 4 according to a first preferred embodiment contains not less than 70% by mass and not more than 90% by mass, and particularly not less than 80% by mass and not more than 90% by mass, of the vinyl chloride-type resin, based on the total mass of the peel-off layer 4.

<Vinyl Chloride-Type Resin>

As used herein, "vinyl chloride-type resin" means a polymer obtained by homopolymerization of vinyl chloride, a copolymer between vinyl chloride and another monomer copolymerizable with vinyl chloride, and a mixture of the polymer and the copolymer. Examples of another monomer copolymerizable with vinyl chloride include vinylidene chloride, ethylene, propylene, acrylonitrile, maleic acid, itaconic acid, acrylic acid, methacrylic acid, and vinyl acetate. These vinyl chloride-type resins may be produced using any of known production methods such as an emulsion polymerization method, a suspension polymerization method, a solution polymerization method, and a block polymerization method. These vinyl chloride-type resins may also be produced using a method other than the above.

Among these vinyl chloride-type resins, a vinyl chloride-vinyl acetate copolymer can be said to be a preferred vinyl chloride-type resin, because it can further improve the peel-off property.

Cured vinyl chloride-type resins obtained by curing the above-described vinyl chloride-type resins with a curing agent can also be used as the vinyl chloride-type resin. Examples of the curing agent include isocyanate-type curing agents.

The peel-off layer 4 according to the first preferred embodiment contains a vinyl chloride-type resin having a number average molecular weight (Mn) of not less than 10000 and not more than 30000. Furthermore, the peel-off layer 4 according to the first preferred embodiment contains a vinyl chloride-type resin having a glass transition temperature Tg of not less than 60° C. and not more than 80° C. The peel-off layer 4 according to the first preferred embodiment can further improve the peel-off property. As used herein, "number average molecular weight (Mn)" means an average molecular weight measured by GPC in terms of polystyrene standards, in accordance with JIS-K7252-1 (2008). The same also applies to the below-described weight average molecular weight (Mw). As used herein, "glass transition temperature (Tg)" means a temperature determined based on measurement of a change in the amount of heat by DSC (Differential Scanning Calorimetry) (DSC method), in accordance with JIS-K-7121 (2012).

<Acrylic-Type Resin>

As used herein, "acrylic-type resin" means a polymer of a monomer of acrylic acid or methacrylic acid, or a derivative thereof, a polymer of an acrylic acid ester or methacrylic acid ester, or a derivative thereof, a copolymer of a monomer of acrylic acid or methacrylic acid with another monomer, or a derivative thereof, a copolymer of a monomer of an acrylic acid ester or methacrylic acid ester with another monomer, or a derivative thereof, a copolymer of a monomer of acrylic acid and a monomer of an acrylic acid ester, a copolymer of a monomer of acrylic acid and a monomer of a methacrylic acid ester, a copolymer of a monomer of methacrylic acid and a monomer of an acrylic acid ester, and a copolymer of a monomer of methacrylic acid and a monomer of a methacrylic acid ester.

Examples of monomers of acrylic acid esters and methacrylic acid esters include cyclohexyl acrylate, cyclohexyl methacrylate, benzyl acrylate, benzyl methacrylate, phenoxyethyl acrylate, phenoxyethyl methacrylate, isobornyl acrylate, isobornyl methacrylate, dicyclopentenyl acrylate, dicyclopentenyl methacrylate, methyl acrylate, methyl methacrylate, ethyl acrylate, ethyl methacrylate, propyl acrylate, propyl methacrylate, butyl acrylate, butyl methacrylate, isobutyl acrylate, isobutyl methacrylate, tert-butyl acrylate, tert-butyl methacrylate, isodecyl acrylate, isodecyl methacrylate, lauryl acrylate, lauryl methacrylate, lauryl tridecyl acrylate, lauryl tridecyl methacrylate, tridecyl acrylate, tridecyl methacrylate, cetyl stearyl acrylate, cetyl stearyl methacrylate, stearyl acrylate, stearyl methacrylate, 2-ethylhexyl acrylate, 2-ethylhexyl methacrylate, octyl acrylate, octyl methacrylate, cyclohexyl acrylate, cyclohexyl methacrylate, benzyl acrylate, benzyl methacrylate, phenoxyethyl acrylate, phenoxyethyl methacrylate, methacrylic acid, acrylic acid, 2-hydroxyethyl acrylate, 2-hydroxyethyl methacrylate, 2-hydroxypropyl acrylate, 2-hydroxypropyl methacrylate, dimethylaminoethyl acrylate, dimethylaminoethyl methacrylate, diethylaminoethyl acrylate, diethylaminoethyl methacrylate, tert-butylaminoethyl acrylate, tert-butylaminoethyl methacrylate, glycidyl acrylate, glycidyl methacrylate, tetrahydrofurfuryl acrylate, tetrahydrofurfuryl methacrylate, ethylene diacrylate, ethylene dimethacrylate, diethylene glycol diacrylate, diethylene glycol dimethacrylate, triethylene glycol diacrylate, triethylene glycol dimethacrylate, tetraethylene glycol diacrylate, tetraethylene glycol dimethacrylate, decaethylene glycol diacrylate, decaethylene glycol dimethacrylate, pentadecaethylene glycol diacrylate, pentadecaethylene glycol dimethacrylate, pentacontahectaethylene glycol diacrylate, pentacontahectaethylene glycol dimethacrylate, butylene diacrylate, butylene dimethacrylate, allyl acrylate, allyl methacrylate, trimethylolpropane triacrylate, trimethylolpropane trimethacrylate, 1,6-hexanediol diacrylate, 1,6-hexanediol dimethacrylate, tripropylene glycol diacrylate, tripropylene glycol dimethacrylate, pentaerythritol tetraacrylate, pentaerythritol tetramethacrylate, dipentaerythritol hexaacrylate, dipentaerythritol hexamethacrylate, neopentyl glycol pentaacrylate, neopentyl glycol pentamethacrylate, phosphazene hexaacrylate, and phosphazene hexamethacrylate.

Examples of another monomer include aromatic hydrocarbons, aryl group-containing compounds, amide group-containing compounds, vinyl chloride, and the like; and styrene, benzylstyrene, phenoxyethyl methacrylate, acrylamide, methacrylamide, and the like.

Furthermore, as the acrylic-type resin, for example, an acrylic-type polyol resin or the like can be used that is obtained by copolymerizing one or more acrylic acid alkyl esters, one or more (meth)acrylic acid esters having hydroxyl groups in their molecules such as 2-hydroxyethyl (meth)acrylate, 2-hydroxybutyl (meth)acrylate, and 2-hydroxy-3-phenoxypropyl (meth)acrylate, and optionally one or more other polymerizable monomers such as styrene.

The peel-off layer 4 according to the first preferred embodiment contains an acrylic-type resin having a weight average molecular weight (Mw) of not less than 20000 and not more than 50000. Furthermore, the peel-off layer 4 according to the first preferred embodiment contains an acrylic-type resin having a glass transition temperature (Tg) of not less than 80° C. and not more than 120° C. The peel-off layer 4 according to the first preferred embodiment can further improve the peel-off property.

Cured acrylic-type resins obtained by curing the above-described acrylic-type resins with a curing agent can also be used as the acrylic-type resin. Examples of the curing agent include isocyanate-type curing agents.

While there is no particular limitation on the content of the acrylic-type resin, the content of the acrylic-type resin is preferably not less than 10% by mass and not more than 30% by mass, based on the total mass of the peel-off layer 4 according to the first embodiment.

The peel-off layer 4 according to the first embodiment may contain other components along with the vinyl chloride-type resin and the acrylic-type resin. Examples of the other components include natural or synthetic resins, for example, polyester-type resins; cellulosic resins such as ethyl cellulose, hydroxy cellulose, hydroxypropylcellulose, methyl cellulose, cellulose acetate, cellulose acetate butyrate, and nitro cellulose; vinyl-type resins such as polyvinyl alcohol, polyvinyl acetate, polyvinyl butyral, polyvinyl acetal, and polyvinyl pyrrolidone; acrylic resins such as polymethyl methacrylate, polyethyl acrylate, polyacrylamide, and acrylonitrile-styrene copolymer; polyamide resin; polyvinyl toluene resin; coumarone-indene resin; polyurethane resin; and silicone-modified or fluorine-modified urethane. These resins may be used alone or as a mixture, for example.

There is no particular limitation on the method for forming the peel-off layer 4 according to the first embodiment. The peel-off layer 4 according to the first embodiment can be formed by preparing a peel-off layer coating liquid containing the vinyl chloride-type resin and the acrylic-type resin, as well as optionally additives such as any resin and an inorganic or organic filler, and applying this coating liquid onto the substrate 1 or any layer provided on the substrate 1, followed by drying. There is no particular limitation on the coating method for the peel-off layer coating liquid, and a method selected as appropriate from known coating methods can be used. Examples of coating methods include a gravure printing method, a screen printing method, and a reverse coating method using a gravure plate. A coating method other than the above can also be used. The same also applies to the coating method to be used for the below-described various coating liquids.

While there is no particular limitation on the thickness of the peel-off layer 4 according to the first embodiment, the thickness is preferably not less than 0.1 µm and not more than 5 µm. The same also applies to the below-described peel-off layer 4 according to a second embodiment.

(Peel-Off Layer According to a Second Embodiment)

Instead of the peel-off layer 4 according to the first embodiment described above, the peel-off layer 4 according to the second embodiment can be used that contains a polyester-type resin having a number average molecular weight (Mn) of not more than 17000, and having a glass transition temperature (Tg) of not less than 50° C. and not more than 120° C. With the thermal transfer sheet 10 having the peel-off layer 4 according to the second embodiment, a predetermined region of the transfer layer 31 where removal is intended can be accurately removed. In particular, even if the thickness of the transfer layer 31 is increased, a predetermined region of the transfer layer 31 where removal is intended can be accurately removed. Herein, the simple recitation "peel-off layer" includes both of the peel-off layer according to the first embodiment and the peel-off layer according to the second embodiment.

In the peel-off layer 4 according to the second embodiment, the polyester-type resin contained therein is a polyester-type resin that satisfies the following conditions 1 and 2:

Condition 1: the number average molecular weight (Mn) of the polyester-type resin is not more than 17000.

Condition 2: the glass transition temperature (Tg) of the polyester-type resin is not less than 50° C. and not more than 120° C.

Hereinafter, a polyester-type resin that satisfies the conditions 1 and 2 may be referred to as a "specific polyester-type resin".

A sufficiently satisfactory peel-off property cannot be obtained if the peel-off layer contains, instead of the "specific polyester-type resin", a polyester-type resin that does not satisfy either one or both of the conditions 1 and 2, or a resin different from the "specific polyester-type resin". Specifically, the transfer layer positioned near the boundary between a non-removal region and a removal region of the transfer layer where removal by the peel-off layer is intended cannot be accurately removed, and a portion of the removal region of the transfer layer that should be originally removed is likely to remain on the intermediate transfer medium. As a result, a predetermined region of the transfer layer 31 where removal is intended cannot be accurately removed. Alternatively, with the boundary between a removal region and a non-removal region as a start point, a portion of the transfer layer in the non-removal region is removed in such a manner as to trail the transfer layer in the non-removal region, and the transfer layer that should originally remain on the intermediate transfer medium, that is, the transfer layer in the non-removal region, is removed along with the transfer layer corresponding to the removal region. As a result, a predetermined region of the transfer layer 31 where removal is intended cannot be accurately removed.

The mechanism by which the peel-off property is improved by using the peel-off layer 4 according to the second embodiment containing the "specific polyester-type resin" has not been revealed yet. However, at least the fact that the number average molecular weight (Mn) and the glass transition temperature (Tg) of the polyester-type resin affect the peel-off property has been revealed from the results of the examples and comparative examples described below.

As used herein, "polyester-type resin" includes polymers containing ester groups obtained by polycondensation between polybasic carboxylic acids and polyhydric alcohols. Examples of polybasic carboxylic acids include terephthalic acid, isophthalic acid, phthalic acid, 2,6-naphthalenedicarboxylic acid, adipic acid, sebacic acid, decanedicarboxylic acid, azelaic acid, dodecadicarboxylic acid, and cyclohexanedicarboxylic acid. Examples of polyhydric alcohols include ethylene glycol, propanediol, butanediol, pentanediol, hexanediol, neopentyl glycol, 1,4-cyclohexanedimethanol, decanediol, 2-ethyl-butyl-1-propanediol, and bisphenol A. The polyester-type resin may also be a copolymer of three or more polybasic carboxylic acids and polyhydric alcohols, or a copolymer with a monomer or polymer such as diethylene glycol, triethylene glycol, or polyethylene glycol. The polyester-type resin as used herein also includes modified products of the above-described polyester-type resins. Examples of modified products of the polyester-type resins include polyester urethane resins.

The peel-off layer 4 according to the second embodiment may also contain other components along with the "specific polyester-type resin". Examples of the other components include polyester-type resins that do not satisfy either one or both of the conditions 1 and 2, and the other components described above for the peel-off layer 4 according to the first embodiment.

Furthermore, the peel-off layer 4 according to the second embodiment may contain two or more "specific polyester-type resins" having different number average molecular weights (Mn) or glass transition temperatures (Tg), while satisfying the conditions 1 and 2.

There is no particular limitation on the content of the "specific polyester-type resin". The peel-off property can be improved simply by including the "specific polyester-type resin" in the peel-off layer 4, regardless of its content. By way of example, the content of the "specific polyester-type resin" is not less than 5% by mass, preferably not less than 10% by mass, more preferably not less than 15% by mass, and particularly preferably not less than 20% by mass, based on the total mass of the peel-off layer 4 according to the second embodiment. The upper limit of the content of the "specific polyester-type resin" is not limited, and is 100% by mass.

The lower limit of the number average molecular weight (Mn) of the "specific polyester-type resin" is not particularly limited, and is preferably not less than 2500, and more preferably not less than 3500.

The peel-off layer 4 according to a second preferred embodiment contains, as the "specific polyester-type resin", a polyester-type resin that has a number average molecular weight (Mn) of less than 9000, more preferably not more than 8000, and satisfies the condition 2. Furthermore, the peel-off layer 4 according to the second preferred embodiment contains, as the "specific polyester-type resin", a polyester resin that satisfies the condition 1, and has a glass transition temperature (Tg) of not less than 50° C. and not more than 100° C. The peel-off layer 4 according to a particularly preferred second embodiment contains, as the "specific polyester-type resin", a polyester resin that has a number average molecular weight (Mn) of less than 9000, more preferably not more than 8000, and has a glass transition temperature (Tg) of not less than 50° C. and not more than 100° C. The peel-off layers 4 according to these second preferred embodiments can further improve the peel-off property.

There is no particular limitation on the method for forming the peel-off layer 4 according to the second embodiment. The peel-off layer 4 according to the second embodiment can be formed by preparing a peel-off layer coating liquid containing the "specific polyester-type resin", as well as optionally additives such as any resin and an inorganic or organic filler, and applying this coating liquid onto the substrate 1 or any layer provided on the substrate 1, followed by drying.

(Primer Layer)

As shown in FIG. 1, the primer layer 2 may be provided between the substrate 1 and the peel-off layer 4. The provision of the primer layer 2 between the substrate 1 and the peel-off layer 4 can sufficiently inhibit the so-called reverse transfer of the peel-off layer in which, upon removing a predetermined region of the transfer layer 31 by means of the peel-off layer 4, the peel-off layer 4 that should originally remain on the thermal transfer sheet 10 along with the removed transfer layer is transferred onto the intermediate transfer medium. In particular, the reverse transfer of the peel-off layer tends to occur when the energy applied to the thermal transfer sheet for removing the transfer layer of the intermediate transfer medium by means of the peel-off layer is increased. In this case, therefore, it is preferred to provide the primer layer 2.

Examples of materials forming the primer layer 2 include polyester-type resins, polyacrylic ester-type resins, polyvinyl acetate-type resins, polyurethane-type resins, styrene acrylate-type resins, polyacrylamide-type resins, polyamide-type resins, polyether-type resins, polystyrene-type resins, polyethylene-type resins, polypropylene-type resins, vinyl-type resins such as polyvinyl chloride resin, polyvinyl alcohol-type resins, and polyvinyl pyrrolidone, polyvinyl acetal-type resins such as polyvinyl acetoacetal and polyvinyl butyral, and inorganic particles.

The thickness of the primer layer 2 is preferably not less than 0.03 µm, and more preferably not less than 0.06 µm. While the upper limit of the thickness of the primer layer 2 is not particularly limited, it is about 1 µm.

There is no particular limitation on the method for forming the primer layer 2. The primer layer 2 can be formed by preparing a primer layer coating liquid by dissolving or dispersing any of the above-exemplified materials and the like in a suitable solvent, and applying this coating liquid onto the substrate 1, followed by drying.

(Back Face Layer)

As shown in FIG. 1, the back face layer 5 may be provided on the other surface of the substrate 1. The back face layer 5 is an optional constituent in the thermal transfer sheet 10 according to an embodiment.

There is no limitation on the material of the back face layer 5, and examples include natural or synthetic resins, for example, cellulosic resins such as ethyl cellulose, hydroxy cellulose, hydroxypropylcellulose, methyl cellulose, cellulose acetate, cellulose acetate butyrate, and nitro cellulose; vinyl-type resins such as polyvinyl alcohol, polyvinyl acetate, polyvinyl butyral, polyvinyl acetal, and polyvinyl pyrrolidone; acrylic-type resins such as polymethyl methacrylate, polyethyl acrylate, polyacrylamide, and acrylonitrile-styrene copolymer; polyamide resin; polyvinyl toluene resin; coumarone-indene resin; polyester-type resins, polyurethane resin; and silicone-modified or fluorine-modified urethane. These resins may be used alone or as a mixture, for example.

The back face layer 5 may also contain a solid or liquid lubricant. Examples of the lubricant include various waxes such as polyethylene wax and paraffin wax, higher aliphatic alcohols, organopolysiloxanes, anionic surfactants, cationic surfactants, amphoteric surfactants, nonionic surfactants, fluorine-type surfactants, organic carboxylic acids and derivatives thereof, metal soaps, fluorine-type resins, silicone-type resins, and fine particles of inorganic compounds such as talc and silica. The mass of the lubricant based on the total mass of the back face layer 5 is not less than 5% by mass and not more than 50% by mass, and preferably not less than 10% by mass and not more than 30% by mass.

There is no particular limitation on the method for forming the back face layer 5. The back face layer 5 can be formed by preparing a back face layer coating liquid by dissolving or dispersing the resin, an optionally added lubricant, and the like in a suitable solvent, and applying this coating liquid onto the substrate 1, followed by drying. The thickness of the back face layer 5 is preferably not less than 1 µm and not more than 10 µm.

Figure 4:
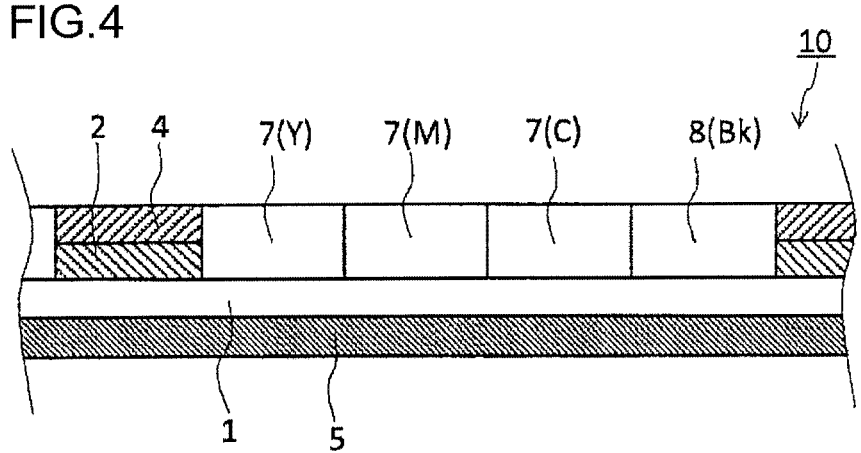
FIG. 4 is a schematic cross-sectional view of the thermal transfer sheet according to an embodiment.

As shown in FIG. 4, the thermal transfer sheet 10 according to an embodiment may have a structure in which respective dye layers 7 of yellow (Y), magenta (M), and cyanogen (C) (7(Y), 7(M), and 7(C)), and a fusible layer 8 of black (Bk) are provided in a frame sequential manner, on the same surface of the substrate 1 as that having the peel-off layer 4. The dye layers 7 and the fusible layer 8 are optional constituents in the thermal transfer sheet 10 according to an embodiment. Furthermore, a transferable protective layer (not illustrated) may be provided in place of these optional layers, or in a frame sequential manner along with these layers.

(Dye Layers)

Each of the dye layers 7 contains a sublimable dye, a binder resin, and optionally added components. The sublimable dye, the binder resin, and the like are not particularly limited, and known ones can be used. Each of the dye layers can be formed by preparing a dye layer coating liquid by dissolving or dispersing the sublimable dye, the binder resin, and optionally added components in a suitable solvent, and applying this coating liquid onto the substrate 1, followed by drying. The thickness of each of the dye layers is usually not less than 0.2 µm and not more than 3 µm.

Furthermore, a known dye primer layer (not illustrated) may be provided between the substrate 1 and the dye layers 7.

(Fusible Layer)

The fusible layer 8 can be formed using a known thermally fusible ink, and optionally contains various additives. These materials are not particularly limited, and known ones can be used. The fusible layer 8 is formed by applying the thermally fusible ink onto the substrate 1 using a method such as a gravure printing method or hot-melt coating, followed by drying. The thickness of the fusible layer is determined based on the relationship between the required density and the thermal sensitivity, and is usually not less than about 0.2 µm and not more than about 10 µm.

<Peel-Off Region>

Figure 5:
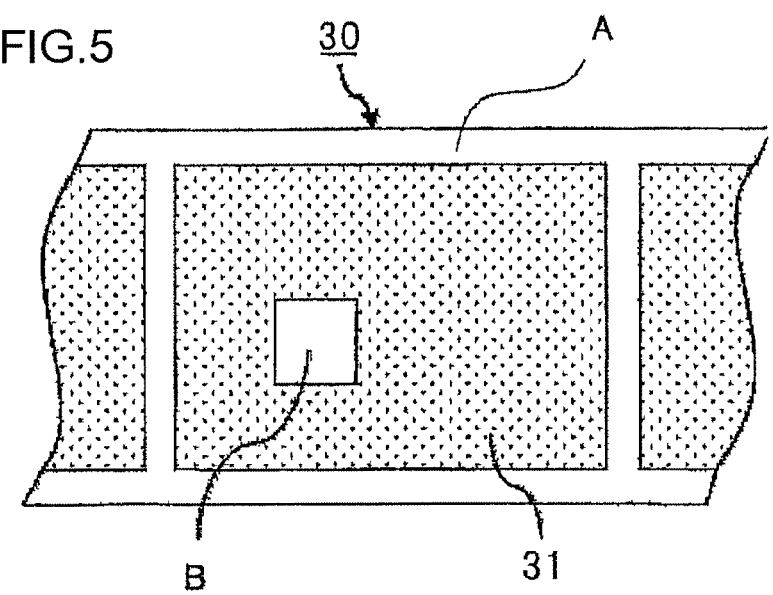
FIG. 5 is a schematic plan view of an intermediate transfer medium for use in combination with the thermal transfer sheet according to an embodiment.

Next, referring to FIG. 5, an example of the removal region of the transfer layer to be removed by the peel-off layer 4 of the thermal transfer sheet 10 according to an embodiment will be described. FIG. 5 is a schematic plan view of the intermediate transfer medium 30 for use in combination with the thermal transfer sheet 10 according to an embodiment. The blank regions (indicated by the symbols "A" and "B" in the figure) are the regions that have been removed by the peel-off layer 4 of the thermal transfer sheet 10 according to an embodiment.

There is no particular limitation on the regions of the transfer layer 31 to be removed, and examples of the regions to be removed include peripheral portions of the transfer layer 31 to be transferred onto a transfer receiving article, as indicated by the symbol "A" in FIG. 5. In other words, the regions that are not to be transferred onto a transfer receiving article can be removed by the peel-off layer 4 to remove the edges. Furthermore, as indicated by the symbol "B" in FIG. 5, examples of the regions to be removed also include a region where an accessory such as an IC chip or a signature portion is to be mounted on the transfer receiving article onto which the transfer layer 31 is to be finally transferred, that is, a region that causes inconvenience if that region of the transfer layer 31 remains on the transfer receiving article onto which the transfer layer 31 has been transferred.

<Heating Method>

There is no particular limitation on the heating device for removing a predetermined region of the transfer layer 31 by means of the peel-off layer 4. For example, a thermal head, or a heating device that uses a light source or a laser light source can be used. Furthermore, there is no limitation on the heating device for re-transferring the transfer layer 31, from which the predetermined region has been removed by the peel-off layer 4, onto a transfer receiving article. For example, a heat roll method, a hot stamping method, or a thermal head method can be used.

The intermediate transfer medium for use in combination with the thermal transfer sheet 10 according to an embodiment is not limited to the illustrated embodiment, and any known intermediate transfer medium is applicable. Furthermore, instead of the intermediate transfer medium, a protective layer transfer sheet in which a transfer layer including a protective layer is provided on a support may be used.

<<Combination of Transfer Foil and Thermal Transfer Sheet>>

Next, a combination of a transfer foil and a thermal transfer sheet according to an embodiment of the present disclosure (hereinafter referred to as the combination according to an embodiment) will be described. The combination according to an embodiment is a combination of a transfer foil in which a transfer layer is provided on a support such that the transfer layer can be peeled off from the support, and a thermal transfer sheet in which a peel-off layer is provided on a substrate, wherein under conditions in which the transfer foil and the thermal transfer sheet are superposed on each other such that the transfer layer and the peel-off layer are opposed to each other, and a transport speed for the thermal transfer sheet is set to 42.3 mm/sec, and energy applied to the thermal transfer sheet is set to 0.143 mJ/dot, adhesion between the transfer layer and the peel-off layer as measured when a predetermined region of the transfer layer is removed by means of the peel-off layer is not less than 0.03 N/cm. Hereinafter, the conditions in which the transfer foil and the thermal transfer sheet are superposed on each other such that the transfer layer and the peel-off layer are opposed to each other, and the transport speed for the thermal transfer sheet is set to 42.3 mm/sec, and the energy applied to the thermal transfer sheet is set to 0.143 mJ/dot, may be referred to as the "specific measurement conditions". The adhesion between the transfer layer and the peel-off layer as measured when a predetermined region of the transfer layer is removed by means of the peel-off layer under the "specific measurement conditions" may be referred to as the adhesion between the transfer layer and the peel-off layer.

Under the "specific measurement conditions", a predetermined region of the transfer layer is removed by the peel-off layer such that the peel angle of the transfer layer to be peeled off from the support becomes 50°.

With the combination according to an embodiment in which the adhesion between the transfer layer and the peel-off layer measured under the "specific measurement conditions" is not less than 0.03 N/cm, a predetermined region of the transfer layer can be accurately removed by the peel-off layer.

In the combination according to a preferred embodiment, the adhesion between the transfer layer and the peel-off layer measured under the "specific measurement conditions" is not less than 0.05 N/cm, preferably not less than 0.18 N/cm, and more preferably not less than 0.2 N/cm. In the combination according to a particularly preferred embodiment, the adhesion between the transfer layer and the peel-off layer measured upon removing a predetermined region of the transfer layer by means of the peel-off layer, under conditions in which the transport speed for the thermal transfer sheet is set to 42.3 mm/sec, and the energy applied to the thermal transfer sheet is set to not less than 0.1 mJ/dot and not more than 0.2 mJ/dot, is not less than 0.03 N/cm, and in particular, the adhesion is as mentioned above in the combination according to a preferred embodiment. There is no particular limitation on the upper limit of the adhesion between the transfer layer and the peel-off layer measured under the "specific measurement conditions". For example, the adhesion may be not less than 0.03 N/cm and not more than 1 N/cm, or not less than 0.03 N/cm and not more than 0.7 N/cm.

Figure 6:
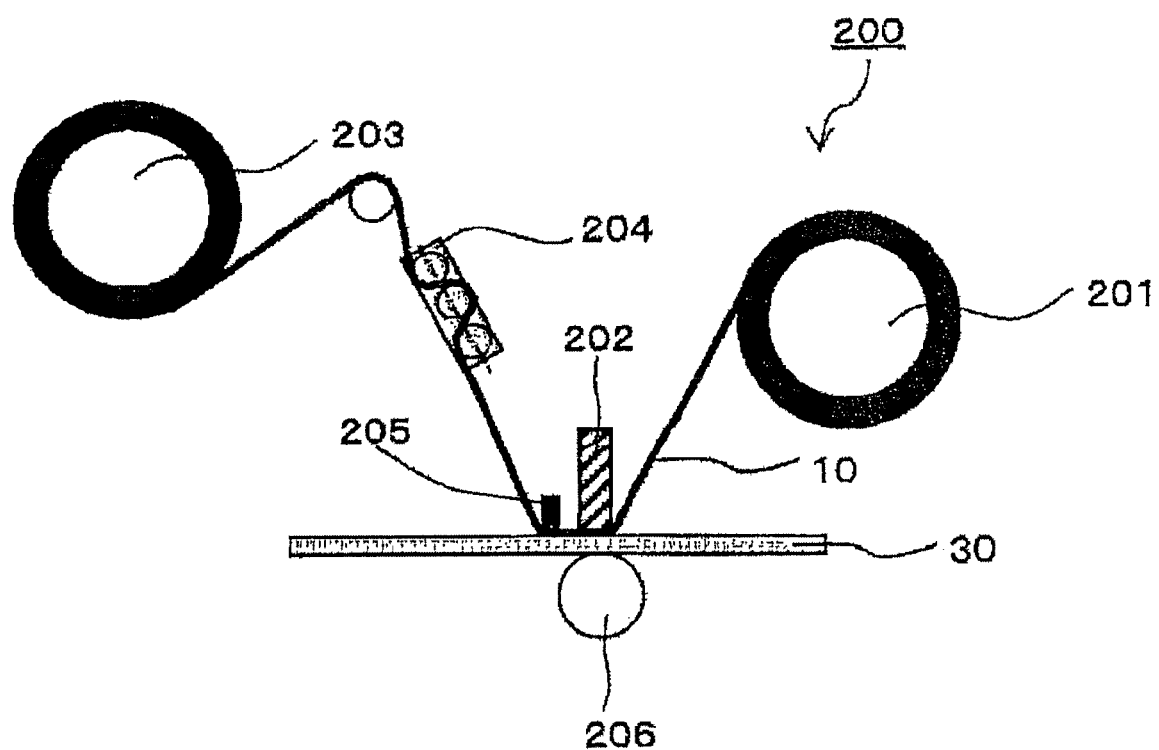
FIG. 6 is a schematic diagram showing one example of a printer for use in removing the transfer layer by means of the peel-off layer of the thermal transfer sheet according to an embodiment.

In the combination according to an embodiment, the adhesion between the transfer layer and the peel-off layer is the value of tensile strength measured as follows: The transfer layer of the transfer foil and the peel-off layer of the thermal transfer sheet are superposed on each other, and, as shown in FIG. 6, using a printer 200 having a thermal transfer sheet feed device 201, a heating device 202, a thermal transfer sheet take-up device 203, a measurement device 204 positioned between the heating device 202 and the thermal transfer sheet take-up device 203 to measure the tensile strength of the thermal transfer sheet transported along the transport path, and a peel device 205 positioned between the heating device 202 and the measurement device 204, the value of tensile strength is measured by the measurement device 204 upon removing the transfer layer of the transfer foil by means of the peel-off layer of the thermal transfer sheet, under the conditions in which the transport speed for the thermal transfer sheet is 42.3 mm/sec, and the applied energy for the thermal transfer sheet is 0.143 mJ/dot. This value of tensile strength can be defined as the adhesion between the transfer layer and the peel-off layer.

As used herein, "applied energy (mJ/dot)" is the applied energy calculated based on the following equation (1), and the applied electric power [W] in the equation (1) can be calculated based on the following equation (2):

$$\text{Applied energy (mJ/dot)} = W \times L.S \times P.D \times \text{gray-scale value} \quad \text{(equation (1))}$$

wherein [W] denotes the applied electric power, [L.S] denotes one line period (msec/line), and [P.D] denotes the pulse duty.

$$\text{Applied electric power } (W/\text{dot}) = V^2/R \quad \text{(equation (2))}$$

wherein [V] denotes the applied voltage, and [R] denotes the resistance of the heating device.

As used herein, "transport speed (mm/sec)" for the thermal transfer sheet is the transport speed calculated based on the following equation (3):

$$\text{Transport speed (mm/sec)} = (25.4 \times 1000)/(\text{print density in the vertical scanning direction (dot/inch)} \times \text{line period (msec/line)}) \quad \text{(equation (3))}$$

wherein 25.4 is the value for converting inch to mm.

There is no particular limitation on the method for setting the adhesion between the transfer layer and the peel-off layer to not less than 0.03 N/cm. Examples of measures taken for the thermal transfer sheet include adjusting the components of the peel-off layer, or adjusting the thickness of the peel-off layer or the substrate. Examples of measures taken for the transfer foil include adjusting the components of the transfer layer, or adjusting the thickness of the transfer layer. Furthermore, the adhesion between the transfer layer and the peel-off layer can be set to not less than 0.03 N/cm by taking measures for both of the thermal transfer sheet and the transfer foil.

That is, as long as the transfer foil and the thermal transfer sheet used in the combination according to an embodiment satisfy the condition that the adhesion between the transfer layer and the peel-off layer measured under the "specific measurement conditions" is not less than 0.03 N/cm, no limitation is placed on the transfer foil and the thermal transfer sheet with respect to conditions other than the above.

There is no particular limitation on the applications of the transfer foil used in the combination according to an embodiment. Examples of the applications include an intermediate transfer medium that can transfer a transfer layer including a receiving layer onto a transfer receiving article, and a protective layer transfer sheet that can transfer a transfer layer including a protective layer onto a transfer receiving article. Furthermore, any medium other than the above that can transfer a transfer layer onto a transfer receiving article can be used.

EXAMPLES

Next, the present invention will be described more specifically with reference to examples. Hereinafter, "part(s)" means part(s) by mass, unless otherwise specified. "Tg" means the glass transition temperature, "Mn" means the number average molecular weight, and "Mw" means the weight average molecular weight.

Example A-1

As a substrate, a 4.5-μm-thick polyethylene terephthalate film subjected to an easy adhesion treatment in advance was used, and a peel-off layer coating liquid 1 of the composition shown below was applied onto one surface, i.e., the easy adhesion-treated surface, of the substrate to give a thickness of 1 μm in a dried state, and dried to form a peel-off layer. Furthermore, a back face layer coating liquid of the composition shown below was applied onto the other surface of the substrate to give a thickness of 0.8 μm in a dried state, and dried to form a back face layer. As a result, a thermal transfer sheet according to Example A-1 was obtained.

<Peel-Off Layer Coating Liquid 1>

| | |
|---|---|
| Vinyl chloride-vinyl acetate copolymer (Mn: 12000, Tg: 76° C.) (SOLBIN (registered trademark) CNL; Nisshin Chemical Co., Ltd.) | 14 parts |
| Acrylic resin (Mw: 25000, Tg: 105° C.) (DIANAL (registered trademark) BR87; Mitsubishi Rayon Co., Ltd.) | 6 parts |
| Methyl ethyl ketone | 80 parts |

<Back Face Layer Coating Liquid>

| | |
|---|---|
| Polyvinyl butyral resin (S-LEC (registered trademark) BX-1; Sekisui Chemical Co., Ltd.) | 2 parts |
| Polyisocyanate (BURNOCK (registered trademark) D750; DIC Corporation) | 9.2 parts |
| Phosphoric ester-type surfactant (PLYSURF (registered trademark) A208N; DKS Co., Ltd) | 1.3 parts |
| Talc (MICRO ACE (registered trademark) P-3; Nippon Talc Co., Ltd.) | 0.3 part |
| Toluene | 43.6 parts |
| Methyl ethyl ketone | 43.6 parts |

Example A-2

A thermal transfer sheet according to Example A-2 was obtained as in Example A-1, except that the peel-off layer coating liquid 1 was replaced with a peel-off layer coating liquid 2 of the composition shown below.

<Peel-Off Layer Coating Liquid 2>

| | |
|---|---|
| Vinyl chloride-vinyl acetate copolymer (Mn: 12000, Tg: 76° C.) (SOLBIN (registered trademark) CNL; Nisshin Chemical Co., Ltd.) | 18 parts |
| Acrylic resin (Mw: 25000, Tg: 105° C.) (DIANAL (registered trademark) BR87; Mitsubishi Rayon Co., Ltd.) | 2 parts |
| Methyl ethyl ketone | 80 parts |

Example A-3

A thermal transfer sheet according to Example A-3 was obtained as in Example A-1, except that the peel-off layer coating liquid 1 was replaced with a peel-off layer coating liquid 3 of the composition shown below.

<Peel-Off Layer Coating Liquid 3>

| | |
|---|---|
| Vinyl chloride-vinyl acetate copolymer (Mn: 27000, Tg: 68° C.) (SOLBIN (registered trademark) C5R; Nisshin Chemical Co., Ltd.) | 14 parts |
| Acrylic resin (Mw: 40000, Tg: 105° C.) (DIANAL (registered trademark) BR83; Mitsubishi Rayon Co., Ltd.) | 6 parts |
| Methyl ethyl ketone | 80 parts |

Example A-4

A thermal transfer sheet according to Example A-4 was obtained as in Example A-1, except that the peel-off layer coating liquid 1 was replaced with a peel-off layer coating liquid 4 of the composition shown below.

<Peel-Off Layer Coating Liquid 4>

| | |
|---|---|
| Vinyl chloride-vinyl acetate copolymer (Mn: 12000, Tg: 76° C.) (SOLBIN (registered trademark) CNL; Nisshin Chemical Co., Ltd.) | 14 parts |
| Acrylic resin (Mw: 25000, Tg: 105° C.) (DIANAL (registered trademark) BR87; Mitsubishi Rayon Co., Ltd.) | 4 parts |
| Polyester resin (UE-9885; Unitika Ltd.) | 2 parts |
| Methyl ethyl ketone | 80 parts |

Example A-5

A thermal transfer sheet according to Example A-5 was obtained as in Example A-1, except that the peel-off layer coating liquid 1 was replaced with a peel-off layer coating liquid 5 of the composition shown below.

<Peel-Off Layer Coating Liquid 5>

| | |
|---|---:|
| Vinyl chloride-vinyl acetate copolymer (Mn: 12000, Tg: 76° C.) (SOLBIN (registered trademark) CNL; Nisshin Chemical Co., Ltd.) | 11 parts |
| Acrylic resin (Mw: 25000, Tg: 105° C.) (DIANAL (registered trademark) BR87; Mitsubishi Rayon Co., Ltd.) | 9 parts |
| Methyl ethyl ketone | 80 parts |

Comparative Example A-1

A thermal transfer sheet according to Comparative Example A-1 was obtained as in Example A-1, except that the peel-off layer coating liquid 1 was replaced with a peel-off layer coating liquid A of the composition shown below.

<Peel-Off Layer Coating Liquid A>

| | |
|---|---:|
| Acrylic resin (Mw: 25000, Tg: 105° C.) (DIANAL (registered trademark) BR87; Mitsubishi Rayon Co., Ltd.) | 20 parts |
| Methyl ethyl ketone | 80 parts |

Comparative Example A-2

A thermal transfer sheet according to Comparative Example A-2 was obtained as in Example A-1, except that the peel-off layer coating liquid 1 was replaced with a peel-off layer coating liquid B of the composition shown below.

<Peel-Off Layer Coating Liquid B>

| | |
|---|---:|
| Vinyl chloride-vinyl acetate copolymer (Mn: 12000, Tg: 76° C.) (SOLBIN (registered trademark) CNL; Nisshin Chemical Co., Ltd.) | 10 parts |
| Acrylic resin (Mw: 25000, Tg: 105° C.) (DIANAL (registered trademark) BR87; Mitsubishi Rayon Co., Ltd.) | 10 parts |
| Methyl ethyl ketone | 80 parts |

Comparative Example A-3

A thermal transfer sheet according to Comparative Example A-3 was obtained as in Example A-1, except that the peel-off layer coating liquid 1 was replaced with a peel-off layer coating liquid C of the composition shown below.

<Peel-Off Layer Coating Liquid C>

| | |
|---|---:|
| Vinyl chloride-vinyl acetate copolymer (Mn: 27000, Tg: 68° C.) (SOLBIN (registered trademark) C5R; Nisshin Chemical Co., Ltd.) | 10 parts |
| Acrylic resin (Mw: 40000, Tg: 105° C.) (DIANAL (registered trademark) BR87; Mitsubishi Rayon Co., Ltd.) | 10 parts |
| Methyl ethyl ketone | 80 parts |

Comparative Example A-4

A thermal transfer sheet according to Comparative Example A-4 was obtained as in Example A-1, except that the peel-off layer coating liquid 1 was replaced with a peel-off layer coating liquid D of the composition shown below.

<Peel-Off Layer Coating Liquid D>

| | |
|---|---:|
| Vinyl chloride-vinyl acetate copolymer (Mn: 12000, Tg: 76° C.) (SOLBIN (registered trademark) CNL; Nisshin Chemical Co., Ltd.) | 20 parts |
| Methyl ethyl ketone | 80 parts |

Comparative Example A-5

A thermal transfer sheet according to Comparative Example A-5 was obtained as in Example A-1, except that the peel-off layer coating liquid 1 was replaced with a peel-off layer coating liquid E of the composition shown below.

<Peel-Off Layer Coating Liquid E>

| | |
|---|---:|
| Vinyl chloride-vinyl acetate copolymer (Mn: 12000, Tg: 76° C.) (SOLBIN (registered trademark) CNL; Nisshin Chemical Co., Ltd.) | 19.6 parts |
| Acrylic resin (Mw: 25000, Tg: 105° C.) (DIANAL (registered trademark) BR87; Mitsubishi Rayon Co., Ltd.) | 0.4 part |
| Methyl ethyl ketone | 80 parts |

(Preparation of Intermediate Transfer Medium (1))

As a support, a 12-μm-thick polyethylene terephthalate film (Lumirror (registered trademark); Toray, Industries, Inc.) was used, and a release layer coating liquid of the composition shown below was applied onto the support to give a thickness of 1.6 μm in a dried state, and dried to form a release layer. Then, a protective layer coating liquid of the composition shown below was applied onto the release layer to give a thickness of 4.7 μm in a dried state, and dried to form a protective layer. Then, a receiving layer coating liquid of the composition shown below was applied onto the protective layer to give a thickness of 2 μm in a dried state, and dried to form a receiving layer. As a result, an intermediate transfer medium (1) was obtained. The release layer coating liquid, the protective layer coating liquid, and the receiving layer coating liquid were all applied using a gravure printing method.

<Release Layer Coating Liquid>

| | |
|---|---:|
| Acrylic resin (DIANAL (registered trademark) BR83; Mitsubishi Rayon Co., Ltd.) | 20 parts |

-continued

| | |
|---|---|
| Polyester resin (Vylon (registered trademark) 600; Toyobo Co., Ltd.) | 1 part |
| Methyl ethyl ketone | 79 parts |

<Protective layer coating liquid>

| | |
|---|---|
| Polyester resin (Vylon (registered trademark) GK-250; Toyobo Co., Ltd.) | 20 parts |
| Methyl ethyl ketone | 80 parts |

<Receiving layer coating liquid>

| | |
|---|---|
| Vinyl chloride-vinyl acetate copolymer (SOLBIN (registered trademark) CNL; Nisshin Chemical Co., Ltd.) | 20 parts |
| Silicone oil (X-22-3000T; Shin-Etsu Chemical Co., Ltd.) | 1 part |
| Methyl ethyl ketone | 79 parts |

<Peel-Off Property Test>

A photo-like thermal transfer image was formed by sublimation transfer on the receiving layer of the intermediate transfer medium (1) prepared above. Then, the receiving layer of the intermediate transfer medium (1) on which the thermal transfer image was formed and the peel-off layer of the thermal transfer sheet according to each of the examples and comparative examples prepared above were superposed on each other to contact each other. Using the printer shown below, the back surface side of the thermal transfer sheet was heated to remove a predetermined region of the transfer layer composed of a layered structure of the release layer, the protective layer, and the receiving layer from the intermediate transfer medium (1). At this time, the removal state of the transfer layer and the release state upon releasing the peel-off layer from the intermediate transfer medium (1) were visually examined, and the peel-off property and the release property of the peel-off layer were evaluated based on the evaluation criteria shown below. The evaluation results are shown in Table 1.

(Printer)
Thermal head: KEE-57-12GAN2-STA (KYOCERA Corporation)
Average resistance of the heating element: 3303 (Ω)
Print density in the horizontal scanning direction: 300 (dpi)
Print density in the vertical scanning direction: 300 (dpi)
Line period: 2 (msec/line)
Print start temperature: 35 (° C.)
Pulse Duty ratio: 85(%)
Applied voltage: 21 (V)
(Evaluation of Peel-Off Property (1))
"Evaluation Criteria"
A: The transfer layer corresponding to the "predetermined region" was accurately removed.
B: The transfer layer was removed in such a manner that a portion of the transfer layer corresponding to the "predetermined region" slightly remained, or the transfer layer slightly extended off the "predetermined region"; however, the peel-off property was at a level that practically causes no problem.
C: The transfer layer was removed in such a manner that a portion of the transfer layer corresponding to the "predetermined region" remained, or the transfer layer extended off the "predetermined region"; however, the peel-off property was at a level that practically causes no problem.
NG (1): The transfer layer corresponding to the "predetermined region" was not accurately removed, and the peel-off property was poor.
NG (2): The transfer layer corresponding to the "predetermined region" was not removed at all, and the peel-off property was poor.

(Evaluation of the Release Property of the Peel-Off Layer)
"Evaluation Criteria"
A: The peel-off layer was not transferred onto the intermediate transfer medium.
NG: A portion of the peel-off layer was transferred onto the intermediate transfer medium, and the release property was poor.

TABLE 1

| | Content (%) of Each Component (*1) | | | |
|---|---|---|---|---|
| | Vinyl Chloride-Type Resin | Acrylic-Type Resin | Peel-Off Property | Release Property |
| Example A-1 | 70 | 30 | B | A |
| Example A-2 | 90 | 10 | A | A |
| Example A-3 | 70 | 30 | B | A |
| Example A-4 | 70 | 20 | A | A |
| Example A-5 | 55 | 45 | B | A |
| Comparative Example A-1 | — | 100 | NG (2) | — |
| Comparative Example A-2 | 50 | 50 | NG (1) | A |
| Comparative Example A-3 | 50 | 50 | NG (1) | A |
| Comparative Example A-4 | 100 | — | A | NG |
| Comparative Example A-5 | 98 | 2 | A | NG |

(*1) The content of each of the vinyl chloride-type resin and the acrylic-type resin based on the total mass of the peel-off layer Example B-1

As a substrate, a 4.5-μm-thick polyethylene terephthalate film subjected to an easy adhesion treatment in advance was used, and a peel-off layer coating liquid 11 of the composition shown below was applied onto one surface, i.e., the easy adhesion-treated surface, of the substrate to give a thickness of 1 μm in a dried state, and dried to form a peel-off layer. Furthermore, the back face layer coating liquid of the composition shown above was applied onto the other surface of the substrate to give a thickness of 0.8 μm in a dried state, and dried to form a back face layer. As a result, a thermal transfer sheet according to Example B-1 was obtained.

<Peel-Off Layer Coating Liquid 11>

| | |
|---|---|
| Polyester resin (Tg: 85° C., Mn: 8000) (Vylon (registered trademark) 885; Toyobo Co., Ltd.) | 20 parts |
| Methyl ethyl ketone | 80 parts |

Example B-2

A thermal transfer sheet according to Example B-2 was obtained as in Example B-1, except that the peel-off layer coating liquid 11 was replaced with a peel-off layer coating liquid 12 of the composition shown below.

<Peel-Off Layer Coating Liquid 12>

| | |
|---|---|
| Polyester resin (Tg: 82° C., Mn: 6000) (UE-9885; Unitika Ltd.) | 20 parts |
| Methyl ethyl ketone | 80 parts |

Example B-3

A thermal transfer sheet according to Example B-3 was obtained as in Example B-1, except that the peel-off layer coating liquid 11 was replaced with a peel-off layer coating liquid 13 of the composition shown below.

<Peel-Off Layer Coating Liquid 13>

| | |
|---|---|
| Polyester resin (Tg: 63° C., Mn: 8000) (UE-3980; Unitika Ltd.) | 20 parts |
| Methyl ethyl ketone | 80 parts |

Example B-4

A thermal transfer sheet according to Example B-4 was obtained as in Example B-1, except that the peel-off layer coating liquid 11 was replaced with a peel-off layer coating liquid 14 of the composition shown below.

<Peel-Off Layer Coating Liquid 14>

| | |
|---|---|
| Polyester resin (Tg: 53° C., Mn: 7000) (UE-3370; Unitika Ltd.) | 20 parts |
| Methyl ethyl ketone | 80 parts |

Example B-5

A thermal transfer sheet according to Example B-5 was obtained as in Example B-1, except that the peel-off layer coating liquid 11 was replaced with a peel-off layer coating liquid 15 of the composition shown below.

<Peel-Off Layer Coating Liquid 15>

| | |
|---|---|
| Polyester resin (Tg: 67° C., Mn: 17000) (Vylon (registered trademark) 200; Toyobo Co., Ltd.) | 20 parts |
| Methyl ethyl ketone | 80 parts |

Example B-6

A thermal transfer sheet according to Example B-6 was obtained as in Example B-1, except that the peel-off layer coating liquid 11 was replaced with a peel-off layer coating liquid 16 of the composition shown below.

<Peel-Off Layer Coating Liquid 16>

| | |
|---|---|
| Polyester resin (Tg: 65° C., Mn: 15000) (UE-9200; Unitika Ltd.) | 20 parts |
| Methyl ethyl ketone | 80 parts |

Example B-7

A thermal transfer sheet according to Example B-7 was obtained as in Example B-1, except that the peel-off layer coating liquid 11 was replaced with a peel-off layer coating liquid 17 of the composition shown below.

<Peel-Off Layer Coating Liquid 17>

| | |
|---|---|
| Polyester resin (Tg: 53° C., Mn: 3000) (Vylon (registered trademark) 220; Toyobo Co., Ltd.) | 20 parts |
| Methyl ethyl ketone | 80 parts |

Example B-8

A thermal transfer sheet according to Example B-8 was obtained as in Example B-1, except that the peel-off layer coating liquid 11 was replaced with a peel-off layer coating liquid 18 of the composition shown below.

<Peel-Off Layer Coating Liquid 18>

| | |
|---|---|
| Polyester resin (Tg: 82° C., Mn: 6000) (UE-9885; Unitika Ltd.) | 2 parts |
| Acrylic resin (DIANAL (registered trademark) BR87; Mitsubishi Rayon Co., Ltd.) | 9 parts |
| Vinyl chloride-vinyl acetate copolymer (SOLBIN (registered trademark) CNL; Nisshin Chemical Co., Ltd.) | 9 parts |
| Methyl ethyl ketone | 80 parts |

Example B-9

A thermal transfer sheet according to Example B-9 was obtained as in Example B-1, except that the peel-off layer coating liquid 11 was replaced with a peel-off layer coating liquid 19 of the composition shown below.

<Peel-Off Layer Coating Liquid 19>

| | |
|---|---|
| Polyester resin (Tg: 82° C., Mn: 6000) (UE-9885; Unitika Ltd.) | 4.8 parts |
| Acrylic resin (DIANAL (registered trademark) BR87; Mitsubishi Rayon Co., Ltd.) | 7.6 parts |
| Vinyl chloride-vinyl acetate copolymer (SOLBIN (registered trademark) CNL; Nisshin Chemical Co., Ltd.) | 7.6 parts |
| Methyl ethyl ketone | 80 parts |

Example B-10

A thermal transfer sheet according to Example B-10 was obtained as in Example B-1, except that the peel-off layer coating liquid 11 was replaced with a peel-off layer coating liquid 20 of the composition shown below.

<Peel-Off Layer Coating Liquid 20>

| | |
|---|---|
| Polyester resin (Tg: 101° C., Mn: 15000) (UE-9900; Unitika Ltd.) | 20 parts |
| Methyl ethyl ketone | 80 parts |

Comparative Example B-1

A thermal transfer sheet according to Comparative Example B-1 was obtained as in Example B-1, except that the peel-off layer coating liquid 11 was replaced with a peel-off layer coating liquid F of the composition shown below.

<Peel-Off Layer Coating Liquid F>

| | |
|---|---|
| Acrylic resin (DIANAL (registered trademark) BR87; Mitsubishi Rayon Co., Ltd.) | 10 parts |
| Vinyl chloride-vinyl acetate copolymer (SOLBIN (registered trademark) CNL; Nisshin Chemical Co., Ltd.) | 10 parts |
| Methyl ethyl ketone | 80 parts |

Comparative Example B-2

A thermal transfer sheet according to Comparative Example B-2 was obtained as in Example B-1, except that the peel-off layer coating liquid 11 was replaced with a peel-off layer coating liquid G of the composition shown below.

<Peel-Off Layer Coating Liquid G>

| | |
|---|---|
| Polyester resin (Tg: 46° C., Mn: 6000) (Vylon (registered trademark) GK-810; Toyobo Co., Ltd.) | 20 parts |
| Methyl ethyl ketone | 80 parts |

Comparative Example B-3

A thermal transfer sheet according to Comparative Example B-3 was obtained as in Example B-1, except that the peel-off layer coating liquid 11 was replaced with a peel-off layer coating liquid H of the composition shown below.

<Peel-Off Layer Coating Liquid H>

| | |
|---|---|
| Polyester resin (Tg: 71° C., Mn: 18000) (UE-9600; Unitika Ltd.) | 20 parts |
| Methyl ethyl ketone | 80 parts |

Comparative Example B-4

A thermal transfer sheet according to Comparative Example B-4 was obtained as in Example B-1, except that the peel-off layer coating liquid 11 was replaced with a peel-off layer coating liquid I of the composition shown below.

<Peel-Off Layer Coating Liquid I>

| | |
|---|---|
| Polyester resin (Tg: 40° C., Mn: 1800) (UE-3320; Unitika Ltd.) | 20 parts |
| Methyl ethyl ketone | 80 parts |

Comparative Example B-5

A thermal transfer sheet according to Comparative Example B-5 was obtained as in Example B-1, except that the peel-off layer coating liquid 11 was replaced with a peel-off layer coating liquid J of the composition shown below.

<Peel-Off Layer Coating Liquid J>

| | |
|---|---|
| Polyester resin (Tg: −25° C., Mn: 34000) (UE-3510; Unitika Ltd.) | 20 parts |
| Methyl ethyl ketone | 80 parts |

Comparative Example B-6

A thermal transfer sheet according to Comparative Example B-6 was obtained as in Example B-1, except that the peel-off layer coating liquid 11 was replaced with a peel-off layer coating liquid K of the composition shown below.

<Peel-Off Layer Coating Liquid K>

| | |
|---|---|
| Polyester resin (Tg: −70° C., Mn: 30000) (Vylon (registered trademark) GM913; Unitika Ltd.) | 20 parts |
| Methyl ethyl ketone | 80 parts |

(Preparation of Intermediate Transfer Medium (2))

An intermediate transfer medium (2) was prepared using the same preparation method as that for the intermediate transfer medium (1), except that the release layer coating liquid was applied to give a thickness of 0.7 μm in a dried state, and dried to form a release layer, the protective layer coating liquid of the composition shown above was applied to give a thickness of 1.5 μm in a dried state, and dried to form a protective layer, and the receiving layer coating liquid of the composition shown above was applied to give a thickness of 0.7 μm in a dried state, and dried to form a receiving layer. As compared with the intermediate transfer medium (2), the intermediate transfer medium (1) has a greater total thickness of the transfer layer composed of a layered structure of the release layer, the protective layer, and the receiving layer, and tends to have a lower peel-off property.

(Evaluation of Peel-Off Property (2))

A photo-like thermal transfer image was formed by sublimation transfer on the receiving layer of the intermediate transfer medium (1) prepared above. Then, the receiving layer of the intermediate transfer medium (1) on which the thermal transfer image was formed and the peel-off layer of the thermal transfer sheet according to each of the examples and comparative examples prepared above were superposed on each other to contact each other. Using the printer shown below, each of the voltages shown in Table 2 below was applied to the back surface side of the thermal transfer sheet to remove a predetermined region of the transfer layer composed of a layered structure of the release layer, the protective layer, and the receiving layer from the intermediate transfer medium (1). At this time, the removal state of the transfer layer was visually examined, and the peel-off property was evaluated based on the evaluation criteria shown below. A similar evaluation was also performed on the intermediate transfer medium (2). The evaluation results are shown in Table 2. The cases where the peel-off property was evaluated as good for both of the intermediate transfer media (1) and (2) at an applied voltage 21 (V) were used as the examples.

(Printer)

Thermal head: KEE-57-12GAN2-STA (KYOCERA Corporation)

Average resistance of the heating element: 3303 (Ω)

Print density in the horizontal scanning direction: 300 (dpi)

Print density in the vertical scanning direction: 300 (dpi)

Line period: 2 (msec/line)

Print start temperature: 35 (° C.)

Pulse Duty ratio: 85(%)

Applied voltage: 18 (V) to 27 (V)

"Evaluation Criteria"

A: The transfer layer corresponding to the "predetermined region" was accurately removed.

B: The transfer layer was removed in such a manner that a portion of the transfer layer corresponding to the "predetermined region" slightly remained, or the transfer layer slightly extended off the "predetermined region"; however, the peel-off property was at a level that practically causes no problem.

C: The transfer layer was removed in such a manner that a portion of the transfer layer corresponding to the "predetermined region" remained, or the transfer layer extended off the "predetermined region"; however, the peel-off property was at a level that practically causes no problem.

NG (1): The transfer layer corresponding to the "predetermined region" was not accurately removed, and the peel-off property was poor.

NG (2): The transfer layer corresponding to the "predetermined region" was not removed at all, and the peel-off property was poor.

TABLE 2

|  | Polyester Resin | | Type of Intermediate Transfer Medium | | | | | | |
|---|---|---|---|---|---|---|---|---|---|
|  |  |  | (1) | (2) | (1) | (2) | (1) | (2) | (1) | (2) |
|  | Mw | Tg | 27 (V) | | 24 (V) | | 21 (V) | | 18 (V) | |
| Example B-1 | 8000 | 85 | A | A | A | A | A | A | B | B |
| Example B-2 | 6000 | 82 | A | A | A | A | A | A | B | B |
| Example B-3 | 8000 | 63 | A | A | A | A | A | A | B | B |
| Example B-4 | 7000 | 53 | B | A | B | A | B | A | B | B |
| Example B-5 | 17000 | 67 | B | A | B | A | B | A | C | B |
| Example B-6 | 15000 | 65 | B | A | B | A | B | A | C | B |
| Example B-7 | 3000 | 53 | NG (2) | NG (2) | A | A | B | A | B | B |
| Example B-8 | 6000 | 82 | B | A | B | A | B | A | B | B |
| Example B-9 | 6000 | 82 | A | A | A | A | A | A | B | B |
| Example B-10 | 15000 | 101 | B | B | B | B | C | C | NG (2) | NG (1) |
| Comparative Example B-1 | None | | B | A | B | A | NG (1) | A | NG (2) | B |
| Comparative Example B-2 | 6000 | 46 | NG (2) | NG (2) | NG (2) | NG (2) | NG (2) | NG (2) | B | B |
| Comparative Example B-3 | 18000 | 71 | B | B | B | B | NG (2) | NG (2) | NG (2) | NG (2) |
| Comparative Example B-4 | 1800 | 40 | NG (2) | NG (2) | NG (2) | NG (2) | NG (2) | NG (2) | B | B |
| Comparative Example B-5 | 34000 | −25 | Not evaluated because of blocking of the thermal transfer sheet | | | | | | | |
| Comparative Example B-6 | 30000 | −70 | Not evaluated because of blocking of the thermal transfer sheet | | | | | | | |

(Preparation of Thermal Transfer Sheet 1)

As a substrate, a 4.5-μm-thick polyethylene terephthalate film subjected to an easy adhesion treatment in advance was used, and a peel-off layer coating liquid 31 of the composition shown below was applied onto one surface, i.e., the easy adhesion-treated surface, of the substrate to give a thickness of 1 μm in a dried state, and dried to form a peel-off layer. Furthermore, the back face layer coating liquid of the composition shown above was applied onto the other surface of the substrate to give a thickness of 0.8 μm in a dried state, and dried to form a back face layer. As a result, a thermal transfer sheet 1 was obtained.

<Peel-Off Layer Coating Liquid 31>

| Vinyl chloride-vinyl acetate copolymer (Mn: 12000, Tg: 76° C.) (SOLBIN (registered trademark) CNL; Nisshin Chemical Co., Ltd.) | 14 parts |
|---|---|
| Acrylic resin (Mw: 25000, Tg: 105° C.) (DIANAL (registered trademark) BR87; Mitsubishi Rayon Co., Ltd.) | 4 parts |
| Polyester resin (UE-9885; Unitika Ltd.) | 2 parts |
| Methyl ethyl ketone | 80 parts |

(Preparation of Thermal Transfer Sheet 2)

A thermal transfer sheet 2 was obtained using the same preparation method as that for the thermal transfer sheet 1, except that the peel-off layer coating liquid 31 was replaced with a peel-off layer coating liquid 32 of the composition shown below to form a peel-off layer.

<Peel-Off Layer Coating Liquid 32>

| Vinyl chloride-vinyl acetate copolymer (Mn: 12000, Tg: 76° C.) (SOLBIN (registered trademark) CNL; Nisshin Chemical Co., Ltd.) | 14 parts |
|---|---|

-continued

| Acrylic resin (Mw: 25000, Tg: 105° C.) (DIANAL (registered trademark) BR87; Mitsubishi Rayon Co., Ltd.) | 6 parts |
|---|---|
| Methyl ethyl ketone | 80 parts |

(Preparation of Thermal Transfer Sheet 3)

A thermal transfer sheet 3 was obtained using the same preparation method as that for the thermal transfer sheet 1, except that the peel-off layer coating liquid 31 was replaced with a peel-off layer coating liquid 33 of the composition shown below to form a peel-off layer.
<Peel-Off Layer Coating Liquid 33>

| Polyester resin (Tg: 82° C., Mn: 6000) (UE-9885; Unitika Ltd.) | 20 parts |
|---|---|
| Methyl ethyl ketone | 80 parts |

(Preparation of Thermal Transfer Sheet 4)
A thermal transfer sheet 4 was obtained using the same preparation method as that for the thermal transfer sheet 1, except that the peel-off layer coating liquid 31 was replaced with a peel-off layer coating liquid 34 of the composition shown below to form a peel-off layer.
<Peel-Off Layer Coating Liquid 34>

| Polyester resin (Tg: 67° C., Mn: 17000) (Vylon (registered trademark) 200; Toyobo Co., Ltd.) | 20 parts |
|---|---|
| Methyl ethyl ketone | 80 parts |

(Preparation of Thermal Transfer Sheet 5)
A thermal transfer sheet 5 was obtained using the same preparation method as that for the thermal transfer sheet 1, except that the peel-off layer coating liquid 31 was replaced with a peel-off layer coating liquid 35 of the composition shown below to form a peel-off layer.
<Peel-Off Layer Coating Liquid 35>

| Polyester resin (Tg: 101° C., Mn: 15000) (UE-9900; Unitika Ltd.) | 20 parts |
|---|---|
| Methyl ethyl ketone | 80 parts |

(Preparation of Thermal Transfer Sheet 6)
A thermal transfer sheet 6 was obtained using the same preparation method as that for the thermal transfer sheet 1, except that the peel-off layer coating liquid 31 was replaced with a peel-off layer coating liquid 36 of the composition shown below to form a peel-off layer.
<Peel-Off Layer Coating Liquid 36>

| Polyurethane resin (Tg: 92° C., Mn: 16000) (UE-1700; Toyobo Co., Ltd.) | 20 parts |
|---|---|
| Methyl ethyl ketone | 80 parts |

(Preparation of Thermal Transfer Sheet 7)
A thermal transfer sheet 7 was obtained using the same preparation method as that for the thermal transfer sheet 1, except that the peel-off layer coating liquid 31 was replaced with a peel-off layer coating liquid 37 of the composition shown below to form a peel-off layer.
<Peel-Off Layer Coating Liquid 37>

| Polyurethane resin (Tg: 56° C., Mn: 10000) (UE-4410; Toyobo Co., Ltd.) | 20 parts |
|---|---|
| Methyl ethyl ketone | 80 parts |

(Preparation of Thermal Transfer Sheet A)
A thermal transfer sheet A was obtained using the same preparation method as that for the thermal transfer sheet 1, except that the peel-off layer coating liquid 31 was replaced with a peel-off layer coating liquid O of the composition shown below to form a peel-off layer.

<Peel-Off Layer Coating Liquid O>

| Vinyl chloride-vinyl acetate copolymer (Mn: 12000, Tg: 76° C.) (SOLBIN (registered trademark) CNL; Nisshin Chemical Co., Ltd.) | 9 parts |
|---|---|
| Acrylic resin (Mw: 25000, Tg: 105° C.) (DIANAL (registered trademark) BR87; Mitsubishi Rayon Co., Ltd.) | 11 parts |
| Methyl ethyl ketone | 80 parts |

(Preparation of Thermal Transfer Sheet B)
A thermal transfer sheet B was obtained using the same preparation method as that for the thermal transfer sheet 1, except that the peel-off layer coating liquid 31 was replaced with a peel-off layer coating liquid P of the composition shown below to form a peel-off layer.
<Peel-Off Layer Coating Liquid P>

| Acrylic resin (Mw: 25000, Tg: 105° C.) (DIANAL (registered trademark) BR87; Mitsubishi Rayon Co., Ltd.) | 20 parts |
|---|---|
| Methyl ethyl ketone | 80 parts |

(Combination of Transfer Foil and Thermal Transfer Sheet)
The thermal transfer sheets prepared above and the intermediate transfer media (1) and (2) prepared above as transfer foils were combined as shown in Table 3 below, to make combinations according to examples and comparative examples. The combinations of transfer foils and thermal transfer sheets in which the adhesion between the transfer layer and the peel-off layer under the "specific measurement conditions" was not less than 0.03 N/cm were used as the combinations of the examples, and the combinations of transfer foils and thermal transfer sheets in which the adhesion between the transfer layer and the peel-off layer under the "specific measurement conditions" was less than 0.03 N/cm were used as the combinations of the comparative examples.

(Measurement of Adhesion)
A photo-like thermal transfer image was formed by sublimation transfer on the receiving layer of the intermediate transfer medium as a transfer foil in each of the combinations shown in Table 3 below. Then, the receiving layer of the intermediate transfer medium on which the thermal transfer image was formed and the peel-off layer of the thermal transfer sheet in each of the combinations shown in Table 3 were superposed on each other to contact each other. Using the test printer shown below, the transport speed for the thermal transfer sheet was set to 42.3 mm/sec, and each of the energies shown in Table 3 below was applied to the back surface side of the thermal transfer sheet to remove a predetermined region of the transfer layer composed of a layered structure of the release layer, the protective layer, and the receiving layer from the intermediate transfer medium. At the time of removal of the predetermined region of the transfer layer from the intermediate transfer medium, the tensile strength of the peel-off layer upon peeling off the transfer layer of the intermediate transfer medium adhered to the peel-off layer, from the support along with the peel-off layer, was measured with a tension meter (model: ASK-1000; Ohkura Industry Co., Ltd.) provided between the take-up roll for the thermal transfer sheet and the heating device (thermal head) in the printer. This tensile strength was determined as the adhesion between the transfer layer and the peel-off layer. Table 3 shows the measurement results of adhesion. The adhesion (N/cm) is the value obtained by dividing the value measured with the tension meter by the width of the energy-applied region. The peel angle of the transfer layer at the time of peeling off the transfer layer from the support was 50° C.

(Test Printer)
Average resistance of the heating element: 5241 (Ω)
Print density in the horizontal scanning direction: 300 (dpi)
Print density in the vertical scanning direction: 300 (dpi)
Line period: 2 (msec/line)
Print start temperature: 29.0 to 36.0 (° C.)
Pulse Duty ratio: 85(%)
Applied voltage: 18 (V) to 24 (V)
Transport speed: 42.3 mm/sec
Width of the energy-applied region: 4.1846 (cm)

(Evaluation of Peel-Off Property (3))
In the measurement of adhesion described above, the removal state of the transfer layer removed by the peel-off layer was visually examined, and the peel-off property was evaluated based on the evaluation criteria shown below. The evaluation results are also shown in Table 3.

"Evaluation Criteria"

A: The transfer layer corresponding to the "predetermined region" was accurately removed.

B: The transfer layer was removed in such a manner that a portion of the transfer layer corresponding to the "predetermined region" slightly remained, or the transfer layer slightly extended off the "predetermined region"; however, the peel-off property was at a level that practically causes no problem.

C: The transfer layer was removed in such a manner that a portion of the transfer layer corresponding to the "predetermined region" remained, or the transfer layer extended off the "predetermined region"; however, the peel-off property was at a level that practically causes no problem.

NG (1): The transfer layer corresponding to the "predetermined region" was not accurately removed, and the peel-off property was poor.

NG (2): The transfer layer corresponding to the "predetermined region" was not removed at all, and the peel-off property was poor.

TABLE 3

| | | | Applied Energy | | | | | |
| --- | --- | --- | --- | --- | --- | --- | --- | --- |
| | | | 0.105 (mJ/dot) | | 0.143 (mJ/dot) | | 0.187 (mJ/dot) | |
| | Thermal Transfer Sheet | Intermediate Transfer Medium | Peel Force | Peel-Off Property | Peel Force | Peel-Off Property | Peel Force | Peel-Off Property |
| Example 1 | 1 | 1 | 0.290 | B | 0.341 | A | 0.412 | A |
| Example 2 | 2 | 1 | 0.263 | B | 0.373 | B | 0.430 | A |
| Example 3 | 3 | 1 | 0.286 | B | 0.322 | A | 0.500 | B |
| Example 4 | 4 | 1 | 0.316 | B | 0.340 | B | 0.436 | B |
| Example 5 | 1 | 2 | 0.268 | B | 0.271 | A | 0.388 | A |
| Example 6 | 2 | 2 | 0.319 | B | 0.294 | A | 0.364 | A |
| Example 7 | 3 | 2 | 0.271 | B | 0.352 | A | 0.477 | B |
| Example 8 | 4 | 2 | 0.293 | B | 0.330 | A | 0.406 | A |
| Example 9 | 5 | 2 | 0.077 | C | 0.126 | C | 0.290 | B |
| Example 10 | 6 | 2 | 0.149 | C | 0.173 | C | 0.298 | B |
| Example 11 | 7 | 2 | 0.284 | B | 0.266 | B | 0.380 | B |
| Comparative Example 1 | A | 1 | 0.021 | NG (1) | 0.021 | NG (1) | 0.024 | NG (1) |
| Comparative Example 2 | B | 1 | 0.017 | NG (2) | 0.020 | NG (1) | 0.020 | NG (1) |
| Comparative Example 3 | B | 2 | 0.019 | NG (1) | 0.017 | NG (1) | 0.017 | NG (1) |

REFERENCE SIGNS LIST

1 Substrate
2 Primer layer
4 Peel-off layer
5 Back face layer
7 Dye layer
8 Fusible layer
10 Thermal transfer sheet
16 Heating device
30 Intermediate transfer medium (transfer foil)
31 Transfer layer
A Peripheral edges of transfer layer
B Region allocated for IC chip
200 Printer
201 Thermal transfer sheet feed device
202 Heating device
203 Thermal transfer sheet take-up device
204 Measurement device
205 Peel device

The invention claimed is:

1. A thermal transfer sheet comprising:
a substrate; and
a peel-off layer affixed to the substrate,
wherein the peel-off layer is not removed from the substrate, and
wherein the peel-off layer contains at least a vinyl chloride-type resin and an acrylic-type resin, and a mass of the vinyl chloride-type resin based on a total mass of the peel-off layer is more than 50% by mass and not more than 95% by mass.

* * * * *